P. DAY.
TAKE-UP MECHANISM FOR LOOMS.
APPLICATION FILED MAY 15, 1908.
913,877.  Patented Mar. 2, 1909.
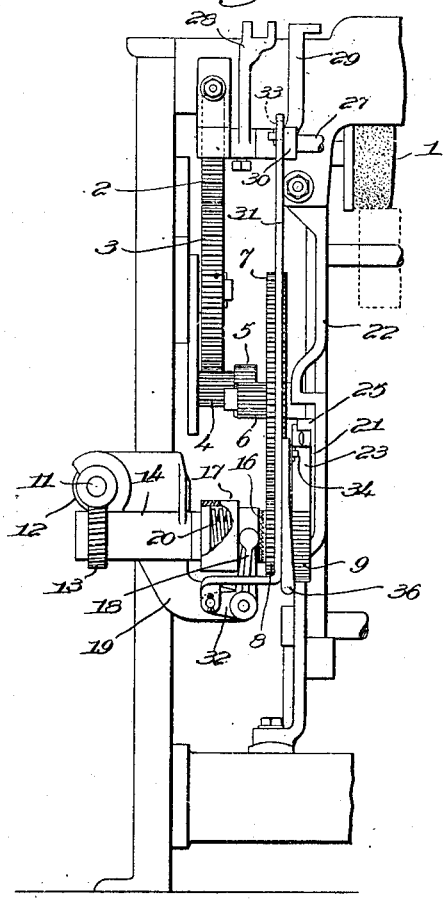
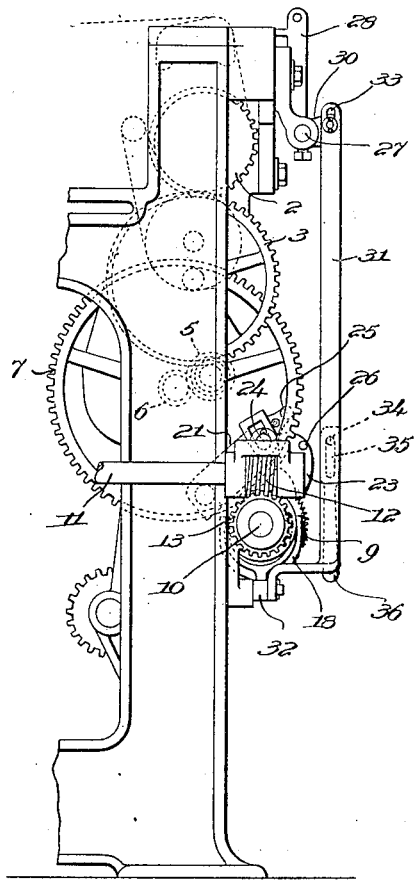
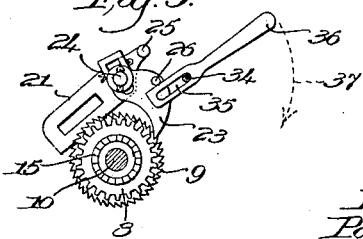
Witnesses,
Edward F. Allen.
Joseph M. Ward.
Inventor,
Paul Day,
by Crosby Gregory
Attys

UNITED STATES PATENT OFFICE.

PAUL DAY, OF HOPEDALE, MASSACHUSETTS, ASSIGNOR TO DRAPER COMPANY, OF HOPEDALE, MASSACHUSETTS, A CORPORATION OF MAINE.

TAKE-UP MECHANISM FOR LOOMS.

No. 913,877.   Specification of Letters Patent.   Patented March 2, 1909.

Application filed May 15, 1908. Serial No. 433,076.

*To all whom it may concern:*

Be it known that I, PAUL DAY, a citizen of the United States, and resident of Hopedale, county of Worcester, State of Massachusetts, have invented an Improvement in Take-Up Mechanism for Looms, of which the following description, in connection with the accompanying drawing, is a specification, like numerals on the drawing representing like parts.

This invention relates to take-up mechanism of the general character shown in United States Patent to Emery No. 648,903, dated May 1, 1900, wherein the take-up is operated by a positively and continuously rotating driving or actuating member, but herein the construction is modified to permit let-back when take-up is arrested by or through filling absence.

It is sometimes desirable to wholly disconnect the take-up mechanism from the control of its actuating and let-back devices, and my present invention has for its object the production of novel and simple means for effecting such release or disconnection of the take-up mechanism at the will of the operator.

Figure 1 is a front elevation of the take-up mechanism at the left-hand side of a loom, with one embodiment of my invention applied thereto; Fig. 2 is a left-hand elevation of the mechanism shown in Fig. 1; Fig. 3 is a detail of the let-back pawl and ratchet, and one member of the clutch between the ratchet and the actuating means for the take-up.

The take-up roll 1 having an attached gear 2 meshing with a gear 3 driven by pinion 4, the latter having an attached and larger pinion 5 meshing with a pinion 6 fixedly secured to or forming a part of the large gear 7, and the smaller gear 8 in continuous mesh with gear 7 and having an attached ratchet 9, rotatably mounted on the shaft 10, may be and are all substantially of well known construction, the train of gearing transmitting motion from the gear 8 to the take-up roll.

As in the patent referred to a constantly rotating shaft 11 has a worm 12 meshing with a worm-gear 13 fast on the shaft 10 mounted in the long bearing 14, but the clutch and let-back differ from the patented structure. One member of the clutch is formed by the teeth 15 on the side of the driven gear 8, said teeth being adapted to coöperate with a series of teeth 16 on the other, movable member 17 of the clutch, in practice rotating with and also movable longitudinally on the shaft 10, a yoke 18 fulcrumed on the stand 19 serving to release the clutch members, the spring 20, see Fig. 1, effecting their coöperation.

An adjustably mounted bracket 21 on the cloth-roll guide 22 carries a let-back pawl 23 slotted to embrace the stud 24 on the bracket, the pawl engaging the ratchet 9 and letting back one or more teeth when take-up is arrested, that is, when the clutch is thrown out of operation. The bracket has a laterally extended lug, 25 Figs. 1 and 3, and a similar lug 26 is formed on the let-back pawl 23, for a purpose to be described. The rock-shaft 27 has an attached arm 28, and a second arm 29 loose thereon is adapted to be swung outward when detection of filling absence effects outward movement of the usual fork-slide, (not shown), as in the Emery patent, turning of the rock-shaft through the arm 28, as by a feeler mechanism, effecting automatic filling replenishment in a well known manner.

Arm 29 has an extension 30 pivotally connected with a depending link 31 jointed at its lower end to an arm 32 on the yoke 18, so that the clutch is rendered inoperative when the arm 29 is swung outward upon detection of filling absence, the link and the extension having a slot-and-pin connection 33, as clearly shown in Fig. 2, so that the link may have a limited longitudinal movement relatively to the extension.

At a point on the link about opposite the lug 26 on the let-back pawl I provide a lateral stud 34, extended loosely through a slot 35 in a releasing handle 36, which under normal conditions occupies the position shown in Figs. 1 and 2, hanging down beside the link and out of the way. When the clutch is thrown out automatically the let-back pawl 23 assumes control of the take-up mechanism and lets back one, two or three teeth, as desired, the return of the arm 29 to normal position permitting the spring 20 to effect the coöperation of the clutch teeth 15 and 16 and consequent resumption of take-up.

If the loom is at rest and the weaver wishes to move the take-up by hand he first swings the handle 36 forward and upward, and then pushes it back longitudinally into the position shown in Fig. 3, the inner end of the handle projecting beneath the lug 26.

Now by bearing down on the handle and turning it in the direction of the arrow 37 on the lug 34 as a fulcrum, see Fig. 3, the pawl 23 is disengaged from the ratchet, and continuing such movement the pawl will be swung up against the fixed lug 25, so that thereafter any additional downward pressure on the handle 36 will act through lug 34 to draw down the link 31 and release the clutch teeth 15 and 16. The take-up mechanism is now freed from the control of the actuating means and the let-back device, and the weaver can manipulate the take-up in either direction with perfect freedom. To restore the parts the handle is drawn forward to disengage it from the lug 26 and when released the handle will drop to the position shown in Figs. 1 and 2. When the link 31 is manually depressed as described the slot-and-pin connection 33 permits such movement of the link without moving the arm 29, as will be obvious.

Having fully described my invention, what I claim as new and desire to secure by Letters Patent is:—

1. The combination with take-up mechanism, an actuator therefor, and a let-back device normally operative when the actuator and take-up mechanism are disconnected, of means, including a longitudinally-movable controlling member, to effect automatically such disconnection, and a manually-operated device mounted on said member to coöperate with and render inoperative at will the let-back device and also to effect disconnecting movement of the controlling member.

2. The combination with take-up mechanism, a driving member, a driven member normally coöperating therewith and in permanent connection with the take-up mechanism, and a normally operative let-back device for said mechanism, of a normally inoperative handle mounted independently of the driving member and movable at will into engagement with and to render inoperative said let-back device and operating by continued movement in the same direction and through coöperation with the latter to disconnect the driving and driven members.

3. The combination with take-up mechanism, a driving member, a driven member normally coöperating therewith and in permanent connection with the take-up mechanism, and a normally operative let-back device for said mechanism, of means, including an automatically operated link to throw the driven member out of operation, and a manually actuated device mounted on the link and adapted to coöperate with and render inoperative the let-back device and thereafter to move the link to throw out the driven member.

4. Take-up mechanism, a let-back device therefor, driving means, and a clutch to connect it with the take-up mechanism, combined with an instrumentality operated automatically to render the clutch inoperative, and a manually operated device to engage and render inoperative the let-back device and to thereafter act through engagement with said device to render the clutch inoperative.

5. The combination, with take-up mechanism, a continuously-rotating driving member therefor, and a driven member normally operated by the driving member, of a ratchet rotatable with the driven member, a let-back pawl normally adapted to coöperate with the ratchet when the driving and driven members are disconnected, a lug on said pawl, a manually operated handle adapted to engage said lug and lift the pawl from the ratchet, means, including a longitudinally movable member, to disconnect automatically the driving and driven members, the handle being mounted on said longitudinally-movable member, and a fixed fulcrum for the handle, manual operation of said longitudinally-movable member being effected when the handle is swung about its fixed fulcrum.

6. The combination, with take-up mechanism, a continuously-rotating driving member therefor, and a driven member normally operated by the driving member, of a ratchet rotatable with the driven member, a let-back pawl normally adapted to coöperate with the ratchet when the driving and driven members are disconnected, a lug on said pawl, a manually operated handle pivotally mounted on a link, and longitudinally movable thereon and adapted to engage said lug and lift the pawl from the ratchet, an arm adapted to be rocked upon failure of filling, the link actuated by such movement of the arm to disconnect the driving and driven members, and a fixed fulcrum for said handle, angular movement of the latter first disengaging the let-back pawl from the ratchet, and subsequent angular movement of the handle about the fixed fulcrum effecting movement of the link to disconnect the driving and driven members.

In testimony whereof, I have signed my name to this specification, in the presence of two subscribing witnesses.

PAUL DAY.

Witnesses:
 ALBERT W. EDWARDS,
 EDWARD DANA OSGOOD.